US006910387B2

(12) United States Patent
Koudal et al.

(10) Patent No.: US 6,910,387 B2
(45) Date of Patent: *Jun. 28, 2005

(54) VORTEX FLOW SENSOR FOR MEASURING FLUID FLOW THROUGH A FLOW TUBE

(75) Inventors: Ole Koudal, Baden (CH); Thomas Nierlich, Lörrach (DE); Rainer Höcker, Waldshut (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/688,983

(22) Filed: Oct. 21, 2003

(65) Prior Publication Data

US 2004/0216532 A1 Nov. 4, 2004

Related U.S. Application Data

(63) Continuation-in-part of application No. 10/233,673, filed on Sep. 4, 2002.
(60) Provisional application No. 60/422,867, filed on Nov. 1, 2002.

(30) Foreign Application Priority Data

Oct. 23, 2002 (DE) .......................................... 102 49 543

(51) Int. Cl.[7] ................................................ G01F 1/32
(52) U.S. Cl. ................................................... 73/861.22
(58) Field of Search ........................... 73/861.22, 861.21, 73/861.23

(56) References Cited

U.S. PATENT DOCUMENTS

| 3,587,312 | A | | 6/1971 | McMurtrie et al. ....... 73/861.22 |
| 4,048,854 | A | * | 9/1977 | Herzl ....................... 73/861.04 |
| 4,404,858 | A | * | 9/1983 | Blechinger ............... 73/861.22 |
| 6,003,383 | A | | 12/1999 | Zielinska et al. ........ 73/861.22 |
| 6,003,384 | A | | 12/1999 | Frohlich et al. ......... 73/861.22 |
| 6,170,338 | B1 | * | 1/2001 | Kleven et al. ........... 73/861.22 |
| 6,237,425 | B1 | * | 5/2001 | Watanobe ................ 73/861.22 |

* cited by examiner

Primary Examiner—Harshad Patel
(74) Attorney, Agent, or Firm—Bacon & Thomas

(57) ABSTRACT

The vortex flow sensor is designed to measure the mass flow rate, the volumetric flow rate, or the flow velocity of a fluid flowing in a flow tube having a tube wall, and has two temperature sensors arranged in such a way that the vortex flow sensor may also be used with fluids which would corrode the temperature sensors. A bluff body in the flow tube sheds vortices and thus causes pressure fluctuations. A vortex sensor device responsive thereto is fitted downstream of the bluff body in a hole provided in the wall of the flow tube. The vortex sensor device comprises a sensor vane extending into the fluid. The temperature sensors are disposed in a blind hole of the sensor vane. Alternatively, the temperature sensor may be disposed in blind hole of the bluff body.

30 Claims, 4 Drawing Sheets

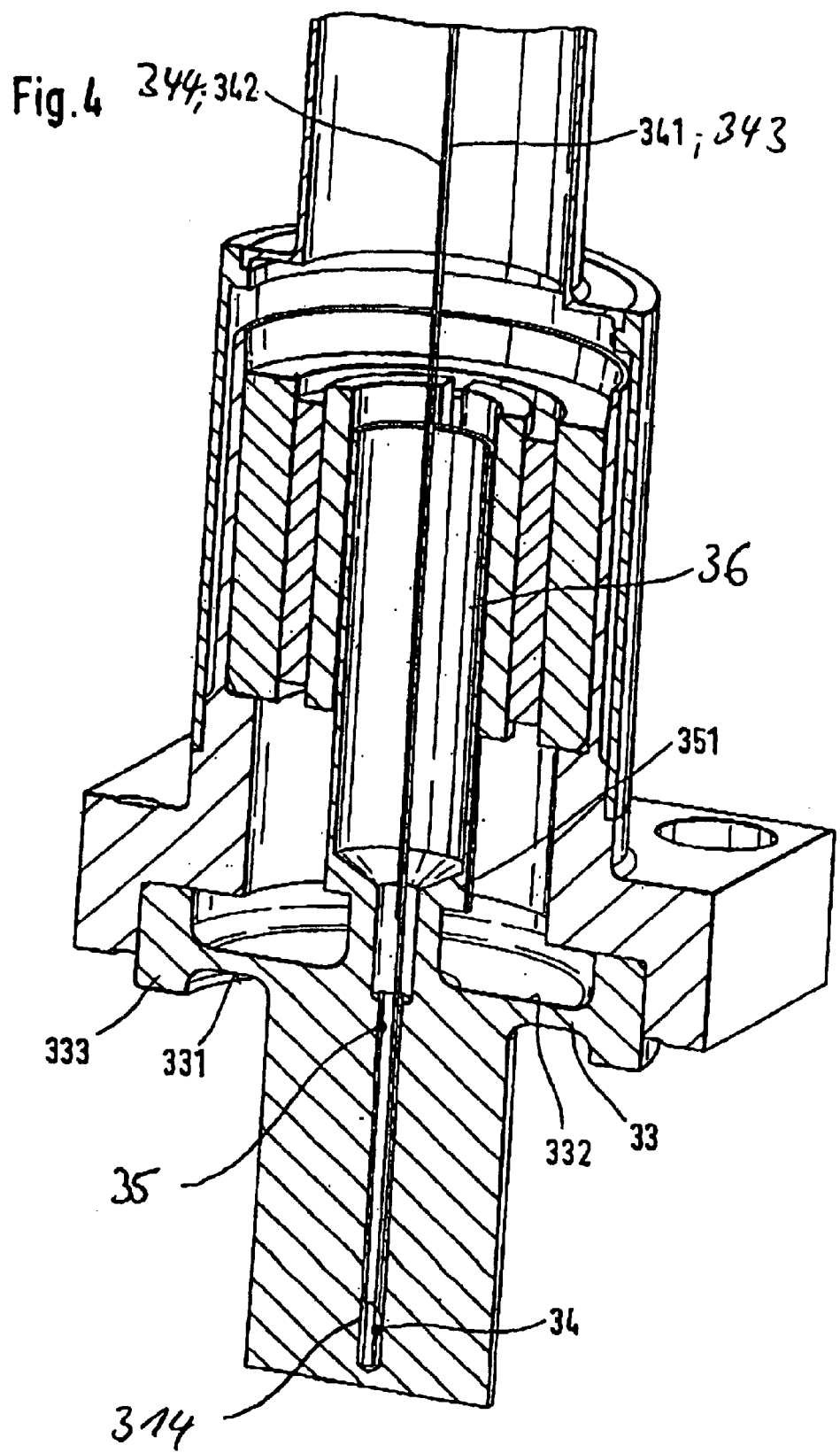

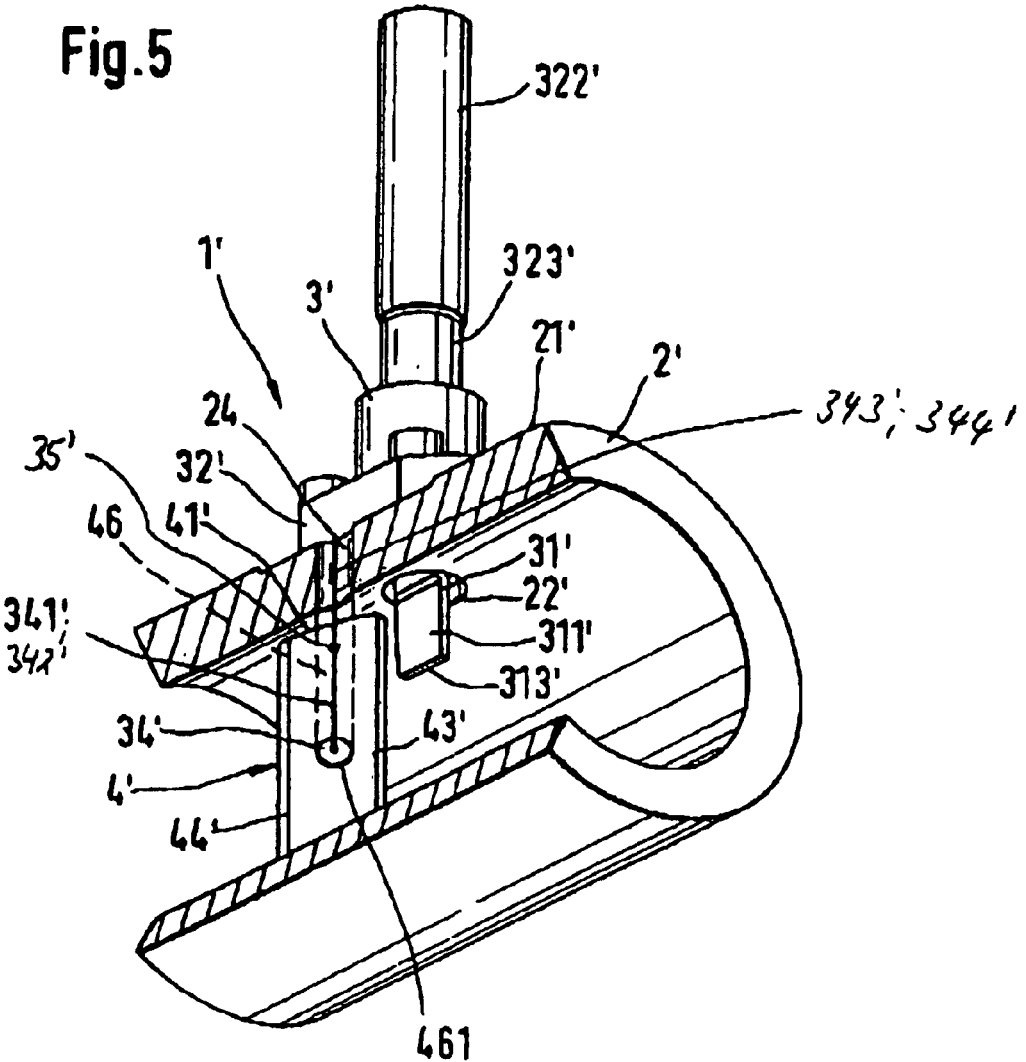

VORTEX FLOW SENSOR FOR MEASURING FLUID FLOW THROUGH A FLOW TUBE

This application is based on Provisional Application No. 60/422,867, filed Nov. 1, 2002.

This application is also a continuation-in-part of prior application Ser. No. 10/233,673, filed Sep. 4, 2002.

FIELD OF THE INVENTION

This invention relates to a vortex flow sensor for measuring the volumetric flow rate, the mass flow rate, or the flow velocity of a fluid flowing through a flow tube, i.e. liquid, vapor or gas, the vortex flow sensor comprising a bluff body disposed in a lumen of the flow tube and serving to shed Kármán vortices.

BACKGROUND OF THE INVENTION

The volumetric flow rate and the mass flow rate are defined as the volume and the mass, respectively, of the fluid that passes through the cross section of the flow tube in a unit time. During operation of such a vortex flow sensor, a Kármán vortex street is, as is known, formed downstream of the bluff body, and the pressure fluctuations of this vortex street are converted by a vortex sensor device into an electric signal whose frequency is proportional to volumetric flow rate and fluid flow velocity, respectively.

U.S. Pat. No. 6,003,384 discloses a vortex flow sensor as is commonly used today for measuring the volumetric flow rate or the flow velocity of a fluid flowing through a flow tube having a tube wall, the vortex flow sensor comprising:

a bluff body, disposed along a diameter of the flow tube, which serves to shed Kármán vortices and is connected to the tube wall of the flow tube from inside at a first and a second fixing location which ar located opposite each other; and a vortex sensor device responsive to pressure fluctuations caused by the vortices which is fitted downstream of the bluff body in a hole formed in the tube wall of the flow tube and seals off this hole, the center of the hole and the center of the first fixing location of the bluff body being located on an element of the cylindrical surface of the flow tube, and said the vortex sensor device including a diaphragm covering the hole and having a first surface facing toward the fluid and a second surface facing away from the fluid, a wedge-shaped sensor vane, attached to the first surface of the diaphragm, which is shorter than the diameter of the flow tube and which has principal surfaces aligned with the element of the cylindrical surface of the flow tube as well as a front edge, and a sensing element attached to the second surface.

If, in addition, the temperature of the fluid is measured, further properties of the fluid, particularly its current thermodynamic state, can be determined by taking into account the instantaneous density of the fluid and, if necessary, an instantaneous pressure in the fluid, so that a mass flow rate can be measured using the volumetric flow rate. This can be done by means of a microprocessor, for example, which is provided in evaluation electronics that are connected to the vortex flow sensor and process measurement signals provided by the latter.

The above facts were described a long time ago in connection with the temperature measurement in vortex flow sensors with different types of vortex sensor devices. U.S. Pat. Nos. 4,048,854 and 4,404,858, for example, each show a temperature sensor which is so positioned on the inside wall of the flow tube as to be passed over by the flowing fluid.

JP-A 2000-2567 discloses a vortex flow sensor for measuring the mass flow rate, the volumetric flow rate, or th flow velocity of a fluid flowing through a flow tub having a tube wall, the vortex flow sensor comprising:

a vane, fixed at one end to the tube wall from inside by means of a base plate, which in use sheds Kármán vortices, is shorter than a diameter of the flow tube, and has parallel principal surfaces perpendicular to the direction of fluid flow as well as a rounded front surface on which a temperature sensor is disposed;

first sensing elements fixed near the fixing location for sensing pressure fluctuations of the flowing fluid caused by the Kármán vortices; and second sensing elements fixed near the fixing location for sensing deflections of the vane caused by the flowing fluid.

This temperature sensor, too, is passed over by the flowing fluid and, as the inventors have found, is not resistant to all fluids occurring in operation, i.e., some fluids corrode temperature sensors arranged in this way.

Therefore, these fluids which corrode the temperature sensor must be excluded by the manufacturer of the vortex flow sensors from use together with this temperature sensor. Such an exclusion, however, narrows the range of application of those vortex flow sensors, i.e., the universality of their applications, and hence diminishes their attraction on the market.

SUMMARY OF THE INVENTION

It is an object of the invention to provide vortex flow sensors having a bluff body, a vortex sensor device fixed in the wall of the flow tube, and at least two temperature sensors which are so positioned that the respective vortex flow sensor may also be used together with fluids which would corrode the temperature sensors.

To attain this object, the invention provides a vortex flow sensor for measuring a fluid flowing in a pipe, particularly for measuring a flow velocity, a volumetric flow rate, and/or a mass flow rate of the fluid, the vortex flow sensor comprising:

a flow tube connected into the pipe for conducting the flowing fluid;

a bluff body disposed in the lumen of the flow tube and serving to shed Kármán vortices;

a vortex sensor device responsive to pressure fluctuations caused by the vortices and comprising a sensor vane extending into the flowing fluid downstream of the bluff body and moved, particularly repeatedly, by the vortices, and at least one sensing element mechanically coupled to the sensor vane and responsive to motions of the sensor vane; and a first temperature sensor and at least a second temperature sensor for sensing temperatures in the flowing fluid.

In a first variant of the invention, the two temperature sensors are disposed within the sensor, particularly spaced appart from each other, vane and are fitted in the sensor vane so as not to be wetted in operation by the flowing fluid.

In a second variant of the invention, the two temperature sensors are disposed within the bluff body, particularly spaced appart from each other, and are fitted in the bluff body so as not to be wetted in operation by the flowing fluid.

In a first embodiment of the invention, the sensor vane or the bluff body has at least one blind hole in which at least one of the two temperature sensors is fitted.

In a second embodiment of the invention, both temperature sensors are fitted in the at least one blind hole.

One advantage of the invention is that the temperature sensors cannot come into contact with the flowing fluid, and thus cannot be corroded by the fluid. Still, the temperature sensors are located so close to the fluid that they measure its temperature practically instantaneously, particularly at different measurement points; they are separated from the fluid only by the thin wall of the vortex sensing element or of the bluff body, and these parts, like the other parts of the vortex flow sensor, are made of metal, for example special steel, and thus have high thermal conductivity.

Another advantage of the invention is that the temperature sensors disposed in the sensor vane or in the bluff body provide an improved measurement of the fluid temperature, particularly of the temperature in a flowing fluid, as is also shown, for example, in F. P. Incropera and D. P. DeWitt, "Fundamentals of Heat and Mass Transfer", 4$^{th}$ Edition, 1996, ISBN 0-471-30460-3, pages 114 to 119 and 407.

BRIEF DESCRIPTION OF THE DRAWINGS

The invention and further advantages will become more apparent by reference to the following description of embodiments of the invention taken in conjunction with the accompanying drawings. Throughout the various figures of the drawings, like parts hav been designated by like reference characters, which, however, have been omitted if this contributes to clarity. In the drawings:

FIG. 4 is a perspective longitudinal section of the vortex sensor device of FIG. 3; and FIG. 5 is a perspective cut-away view analogous to FIG. 2 of a vortex flow sensor according to the second variant of the invention.

DETAILED DESCRIPTION OF EXEMPLARY EMBODIMENTS

Figure 1:
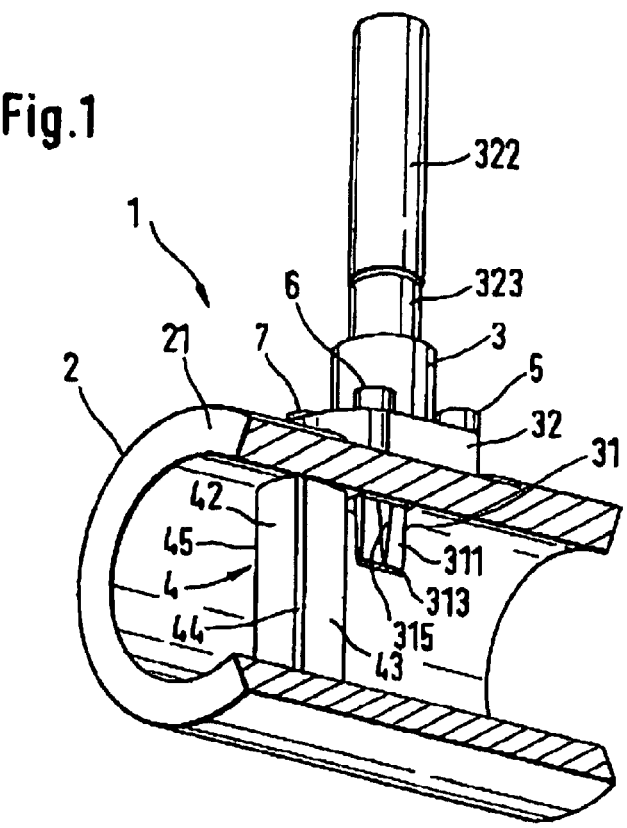
FIG. 1 is a perspective cut-away view in the direction of fluid flow of a vortex flow sensor according to the first variant of the invention.

While the invention is susceptible to various modifications and alternative forms, exemplary embodiments thereof have been shown by way of example in the drawings and will herein be described in detail. It should be understood, however, that there is no intent to limit the invention to the the particular forms diclosed, but on the contrary, the intention is to cover all modifications, equivalents, and alternatives falling within the spirit and scope of the invention as defined by the intended claims.

Figure 2:
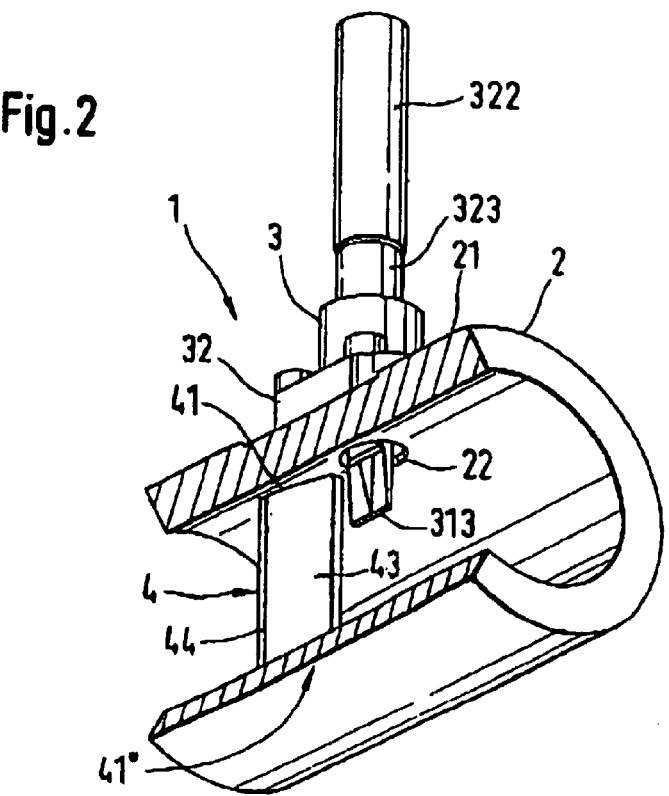
FIG. 2 is a perspective cut-away view in the direction opposite fluid flow of the vortex flow sensor of FIG. 1.

FIGS. 1 to 4 will be described together, because it is not possible to represent all details in every figure. The perspective views of an embodiment of the first variant, which are shown in FIGS. 1 and 2 and serve to provide an overall view, show a cut-away vortex flow sensor 1 as viewed in the direction of fluid flow (FIG. 1) and in the opposite direction (FIG. 2), which comprises a vortex sensor device 3 which is fixed to a wall 21 of a flow tube 2 and extends through a hole 22.

Vortex sensor device may be a dynamically compensated vortex sensor with a capacitive sensing element as is disclosed in U.S. Pat. No. 6,003,384, whose contents are incorporated herein by reference.

Disposed inside flow tube 2 along a diameter thereof is a bluff body 4 which is permanently connected with flow tube 2, forming a first fixing location 41, which is illustrated, and a second fixing location 41*, which is concealed. The center of hole 22 and the center of fixing location 41 are located on an element of the cylindrical surface of flow tube 2.

Bluff body 4 has a baffle surface 42 against which a fluid to be measured, for example a liquid, a gas, or a vapor, flows during operation of the vortex flow sensor. Bluff body 4 also has two lateral surfaces, of which only one, the (front) lateral surface 43, can be seen in FIGS. 1 and 2. Baffle surface 42 and the lateral surfaces form two separation edges, of which only one, the (front) separation edge 44, is completely visible in FIG. 1, while the other, the (rear) separation edge 45, is only indicated.

The bluff body 4 of FIGS. 1 and 2 has essentially the shape of a straight triangular column, i.e., of a column of triangular cross section. It is also possible to use other conventional shapes of the bluff body in the invention.

As the fluid flows against baffle surface 42, a Kármán vortex street is form d downstream f bluff body 4 due to the fact that vortices are shed alternately from the separation edges and are carried along by the flowing fluid, These vortices cause local pressure fluctuations in the fluid, and the number of flow separations per unit of time, i.e., the so called vortex frequency, is a measure of the flow velocity of and/or the volumetric flow rate of the fluid.

The pressure fluctuations are converted by vortex sensor device 3 into an electric vortex signal which is fed to evaluation electronics (not shown) that calculate the flow velocity and/or the volumetric flow rate of the fluid in the usual manner.

Figure 3:
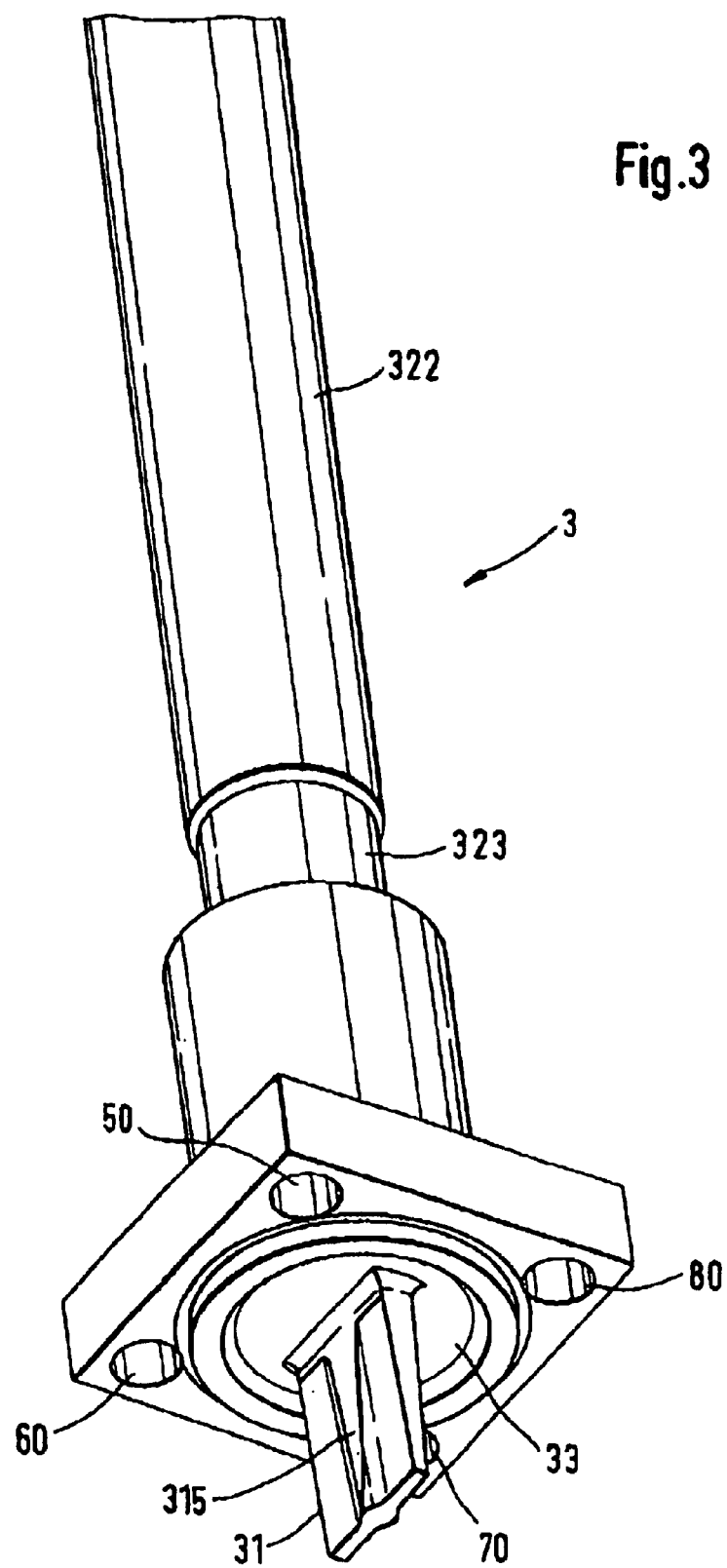
FIG. 3 is a perspective bottom view of the vortex sensor device of FIGS. 1 and 2.

Vortex sensor device 3 is fitted downstream of bluff body 4 in the hole 22 formed in wall 21 of flow tube 2, and seals the hole 22 toward the circumferential surface of flow tube 2, for which purpose it is screwed to tube wall 21. In this embodiment, four screws are used, of which the screws 5, 6, 7 can be seen in FIGS. 1 and 2, while the associated holes 50, 60, 70, 80 are shown in FIG. 3.

Of the vortex sensor device 3, a wedge-shaped sensor vane 31, which extends into the interior of flow tube 2 through the hole 22 in tube wall 21, and a housing cap 32 can be seen in FIGS. 1 and 2. Housing cap 32 ends in an extension 322; between these two portions, a thinner-walled intermediate portion 323 is provided, see the above-mentioned U.S. Pat. No. 6,003,384.

Sensor vane 31 has principal surfaces, of which only the surface 311 can be seen in FIGS. 1 and 2. The principal surfaces are aligned with the above-mentioned element of the cylindrical surface of flow tube 2 and form a front edge 313. Sensor vane 31 may also have other suitable three-dimensional shapes; for example, it may have two parallel principal surfaces which form two parallel front edges.

Sensor vane 31 is shorter than the diameter of flow tube 2; it is rigid and has a blind hole 314 (can only be seen in FIG. 4). For blind hole 314 to have a sufficient diameter, wall portions protrude from the principal surfaces; of these wall portions, the portion 315 is indicated in FIG. 3. Blind hole 314 extends to the vicinity of front edge 313, where it has a bottom.

Vortex sensor device 3 further includes a diaphragm 33 which covers the hole 22 and has a first surface facing toward the fluid, 331, and a second surface facing away from the fluid, 332, see FIGS. 3 and 4. Sensor vane 31 is fixed to surface 331, and a sensing element 36 is fixed to surface 332. Sensor vane 31, diaphragm 33, the annular rim 333 of the latter, and the part 351 of sensing element 36 attached to diaphragm 33 may be formed from a single piece of material, e.g., metal, particularly special steel. Sensing element 36 produces the above-mentioned signal whose frequency is proportional to the volumetric flow rate of the fluid.

Fixed near the bottom of blind hole 314 is a first temperature sensor 34, which provides to the above-mentioned evaluation electronics a temperature signal influenced by a temperature in the flowing fluid. Above temperature sensor 34, a second temperature sensor 35 is provided in blind hole 314 for producing a second temperature signal which is also influenced by the temperature in the fluid. Both temperature sensors 34, 35 may be implemented with platinum resistance elements, such as Pt 100 or Pt 1000, but it is also possible to use thermocouples or temperature-sensitive semiconductor devices, for example.

Since sensor vane 31, and particularly its wall portion 315, can be made sufficiently thin and may be made of metal, temperature sensor 34, located closer to the bottom of blind hole 314, is virtually at the instantaneous temperature of the fluid flowing past sensor vane 31. Because of the low heat capacity of the assembly, this temperature sensor is also very well able to follow changes in the temperature of the fluid sufficiently fast and practically instantaneously.

Temperature sensor 35 in blind hole 314 should be positioned close to diaphragm 33, so that it can measure a temperature that is influenced as little as possible by the instantaneous flow conditions in the fluid.

Thus, using the temperature signals from temperature sensors 34 and 35 in conjunction with, e.g., mathematical models stored in the evaluation electronics for the heat transfer from the fluid to sensor vane 31 or for heat propagation processes within sensor vane 31, the temperature can be determined much more accurately than with only a single temperature sensor, for example.

Based on a highly accurately determined fluid temperature in conjunction with the likewise determined instantaneous volumetric flow rate, the density and/or the mass flow rate of the fluid can now also be determined with a high degree of accuracy. In addition, the Reynolds number and the Strouhal number can be very accurately determined on the basis of the fluid temperature measured in this way, so that any corrections of the measured volumetric flow rate that may be necessary can be made.

Leads 341, 342, 343, 344 connected in pairs to temperature sensors 34 and 35 and serving to couple the latter to the evaluation electronics run centrally upwards through vortex sensor devices 3. One of the leads of each pair 341, 342 or 343, 344 can be dispensed with if temperature sensor 34 or 35, respectively, is electrically contacted at one end by sensor vane 31 and thus connected to ground potential; it is also possible to replace the leads 341, 343 with a common ground wire, for example.

To fix the two temperature sensors 34, 35 in blind hole 314, the latter is filled during the manufacture of vortex sensor device 3, after the positioning of sensors 34, 35, with a potting compound, particularly with a compound of high thermal conductivity and high temperature resistance, such as ceramic adhesive or epoxy adhesive.

Advantageously, the upper portion of blind hole 314 close to the diaphragm, particularly the portion in the area of the protruding wall portions, may be slightly wider than the portion near the bottom so as to facilitate the installation of the two temperature sensors 34, 35 and their leads 341, 342, 343, 344 and/or the filling of the blind hole with potting compound.

FIG. 5, in analogy to FIG. 2, shows a perspective cutaway view of a vortex flow sensor 1' according to the second variant of the invention. The parts of FIG. 5 corresponding to parts of FIG. 2 will not be explained again, but their reference characters in FIG. 2 have been provided with a prime.

The embodiment of the second variant of the invention differs from the embodiment of the first variant in that bluff body 4' is provided with a blind hole 46 which is aligned with a second hole 24 in tube wall 2' and contains the two temperature sensors 34', 35', and that the wedge-shaped sensor vane 31' has two plane principal surfaces 311'. Temperature sensors 34' and 35' are connected to leads 341', 342' and 343', 344', respectively.

Blind hole 46 in bluff body 4 may extend down to an arbitrary depth; its bottom 461 is located so that temperature sensor 34' is positioned in the middle of bluff body 4'. Analogously to the first variant, the second temperature sensor 35' should be positioned as close to tube wall 21' as possible.

Since bluff body 4' can be made sufficiently thin in the area of blind hole 46 and, like the sensor vane 31 of FIGS. 1 to 4, may be made of metal, particularly special steel, temperature sensor 34', too, is virtually at the instantanous temperature of the fluid flowing past bluff body 4' and, because of the low heat capacity of the assembly, is very well able to follow chang s in the temperature of the fluid sufficiently fast and practically instantaneously. Thus, the temperature of the fluid can be determined from the temperature signals provided by temperature sensors 34', 35' with a very high degree of accuracy, particularly by using mathematical models for the heat transfer from the fluid to bluff body 4' or for heat propagation processes within bluff body 4'.

Due to the high accuracy of measuring both, the flow velocity and the temperature of the flowing fluid, the vortex flow sensor according to the invention may be particularly suitable for measuring flowing steam or vapor. Further, the vortex flow sensor may be also most useful for determining the density and/or the heat quantity being accumulated within the flowing fluid, for example liquid or steam.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed is:

1. A vortex flow sensor for measuring a fluid flowing in a pipe, particularly for measuring a flow velocity, a volumetric flow rate, and/or a mass flow rate of the fluid, the vortex flow sensor comprising:

a flow tube connected into the pipe for conducting the flowing fluid;

a bluff body disposed in the lumen of the flow tube and serving to shed Karman vortices; and a vortex sensor device responsive to pressure fluctuations caused by the vortices, said vortex sensor device including a sensor vane extending into the flowing fluid downstream of the bluff body and being moved, particularly repeatedly, by the vortices, and at least one sensing element mechanically coupled to the sensor vane and responsive to motions of the sensor vane;

wherein the vortex flow sensor further comprises a first temperature sensor and at least a second temperature sensor for sensing temperatures in the flowing fluid, said first and second temperature sensors being disposed within the sensor vane and being fitted therein in such a way as not to be wetted in operation by the flowing fluid.

2. A vortex flow sensor as set forth in claim 1 wherein the sensor vane has at least one blind hole in which at least one of the two temperature sensors is fitted.

3. A vortex flow sensor as set forth in claim 2 wherein the first and second temperature sensors are fitted in the at least one blind hole.

4. The apparatus as claimed in claim 2 wherein the blind hole is filled with a potting compound to fix the at least one temperature sensor being fitted within said blind hole.

5. The apparatus as claimed in claim 4 wherein the potting compound is selected from a group consisting of ceramic adhesives and epoxy adhesives.

6. A vortex flow sensor as set forth in claim 1 wherein the first and second temperature sensors are spaced from each other.

7. Use of a vortex flow sensor as set forth in claim 1 for measuring flowing vapor.

8. The apparatus as claimed in claim 1 wherein the sensor vane has a principal surface and wherein a wall-part of said blind hole protrudes from said principal surface.

9. The apparatus as claimed in claim 1 wherein the sensor vane is wedge-shaped.

10. The apparatus as claimed in claim 1 wherein the sensor vane is made from a metal.

11. The apparatus as claimed in claim 1 wherein the temperature sensors comprise platinum resistance elements.

12. The apparatus as claimed in claim 1 wherein the temperature sensors comprise thermocouples.

13. The apparatus as claimed in claim 1 wherein the temperature sensors comprise temperature sensitive semiconductor devices.

14. The apparatus as claimed in claim 1 further comprising evaluation electronics for calculating at least one of the volume flow, the mass flow and the flow velocity of said fluid.

15. A vortex flow sensor for measuring a fluid flowing in a pipe, particularly for measuring a flow velocity, a volumetric flow rate, and/or a mass flow rate of the fluid, the vortex flow sensor comprising:

a flow tube connected into the pipe for conducting the flowing fluid;

a bluff body disposed in the lumen of the flow tube and serving to shed Karman vortices; and a vortex sensor device responsive to pressure fluctuations caused by the vortices, said vortex sensor device including a sensor vane extending into the flowing fluid downstream of the bluff body and being moved, particularly repeatedly, by the vortices, and at least one sensing element mechanically coupled to the sensor vane and responsive to motions of the sensor vane;

wherein the vortex flow sensor further comprises a first temperature sensor and at least a second temperature sensor for sensing temperatures in the flowing fluid, said first and second temperature sensors being disposed within the bluff body and being fitted therein in such a way as not to be wetted in operation by the flowing fluid.

16. A vortex flow sensor as set forth in claim 15 wherein the bluff body has at least one blind hole in which at least one of the two temperature sensor is fitted.

17. A vortex flow sensor as set forth in claim 16 wherein the first and second temperature sensors are fitted in the at least one blind hole.

18. A vortex flow sensor as set forth in claim 15 wherein the first and second temperature sensors are spaced from each other.

19. Use of a vortex flow sensor as set forth in claim 15 for measuring flowing vapor.

20. A vortex flow sensor for measuring a fluid flowing in a pipe, particularly for measuring a flow velocity, a volumetric flow rate, and/or a mass flow rate of the fluid, the vortex flow sensor comprising:

a flow tube connected into the pipe for conducting the flowing fluid;

a bluff body disposed in the lumen of the flow tube and serving to shed Karman vortices;

a vortex sensor device responsive to pressure fluctuations caused by the vortices and to convert pressure fluctuations into an electric vortex signal; and a first temperature sensor and at least a second temperature sensor for sensing temperatures in the flowing fluid, said first and second temperature sensors being disposed within said bluff body.

21. A vortex flow sensor as set forth in claim 20 wherein the first and second temperature sensors are fitted therein in such a way as not to be wetted in operation by the flowing fluid.

22. A vortex flow sensor as set forth in claim 20 wherein the bluff body has at least one blind hole in which at least one of the two temperature sensor is fitted.

23. A vortex flow sensor as set forth in claim 22 wherein the first and second temperature sensors are fitted in the at least one blind hole.

24. A vortex flow sensor as set forth in claim 20 wherein the first and second temperature sensors are spaced from each other.

25. A vortex flow sensor as set forth in claim 20 wherein the first temperature sensor provides a first temperature signal influenced by a temperature in the flowing fluid.

26. A vortex flow sensor as set forth in claim 25 wherein the second temperature sensor provides a second temperature signal influenced by temperature in the flowing fluid.

27. A vortex flow sensor as set forth in claim 26, further comprising an evaluation electronics for processing measurement signals, said evaluation electronics being fed by said vortex signal and said first and second temperature signals.

28. A vortex flow sensor as set forth in claim 27, wherein in the evaluation electronics is stored a mathematical model for the heat transfer from the fluid to bluff body.

29. A vortex flow sensor as set forth in claim 27, wherein in the evaluation electronics is stored a mathematical model for heat propagation processes within bluff body.

30. Use of a vortex flow sensor as set forth in claim 20 for measuring flowing vapor.

* * * * *